No. 789,920. PATENTED MAY 16, 1905.
J. J. KOGER.
ANTIJUMPING DEVICE FOR LIVE STOCK.
APPLICATION FILED OCT. 12, 1904.
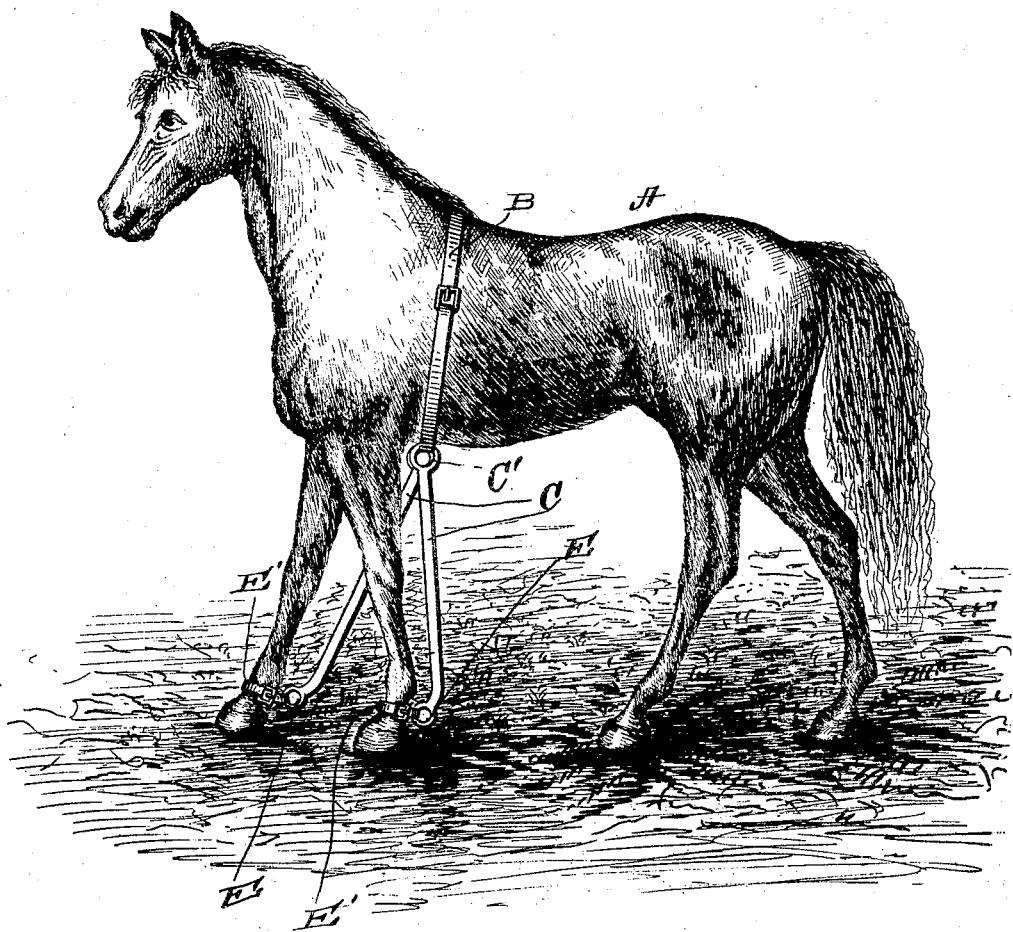
Witnesses
R. A. Boswell.
Nellie A. Mayhew.
Inventor
J. J. Koger,
By Franklin H. Hough,
Attorney No. 789,920. Patented May 16, 1905.

UNITED STATES PATENT OFFICE.

JOHN JAMES KOGER, OF MOORESBURG, TENNESSEE.

ANTIJUMPING DEVICE FOR LIVE STOCK.

SPECIFICATION forming part of Letters Patent No. 789,920, dated May 16, 1905.

Application filed October 12, 1904. Serial No. 228,200.

*To all whom it may concern:*

Be it known that I, JOHN JAMES KOGER, a citizen of the United States, residing at Mooresburg, in the county of Hawkins and State of Tennessee, have invented certain new and useful Improvements in Antijumping Devices for Live Stock; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in anti-stock-jumping devices or yokes; and it has for its object the provision of a simple, inexpensive, as well as practical, and efficient device of this character, the construction of the device being such as to be readily attached to a horse, cow, sheep, or other animal, which, while in no way inconveniencing the free movement of the animal in pasturing, will at the same time render it impossible for it to jump fences.

To this end and to such others as the invention may pertain the same consists in the novel construction of the device, as will be hereinafter more fully described, shown in the accompanying drawings, and then specifically defined in the appended claim.

The invention is clearly illustrated in the accompanying drawing, forming a part of this specification, in which drawing I have shown a side elevation of a horse with my antijumping device attached thereto.

Reference now being had to the details of the drawing by letter, A designates a horse provided with a girth or band B.

C C are rods or bars of wood or metal, preferably, however, made of round iron or steel slightly curved at a point near one of its ends, said bars being provided at their extreme opposite ends with loops or openings C'. These rods or bars have at their upper ends loops or openings for the girth or band B to pass through and around the body of the horse, and at their lower ends each of the said bars or rods has attached a link or ring E, through which the ankle-strap E' is passed, which ankle-strap is passed about the ankle of the fore legs of the animal. Two of the bars or rods are used, one being attached in the manner described to the ankle of each of the fore feet.

From the foregoing description the operation of the device will be readily understood. While the bars or rods C are so connected with the forward ankles of the animal as to permit the free movement of the limbs in walking they will serve to effectually prevent the bending of the knee to the extent that is necessary in jumping.

While I have shown the device as applied to a horse, it is at once evident that it is equally well adapted for use upon all domestic animals, such as cattle, sheep, &c.

It is at once evident that my invention is capable of many modifications in detail without departing from the spirit of the invention—as for instance, the form of the rods or bars used may be varied, and in some cases it may be proposed to employ but a single rod or bar attached to a single ankle of the animal.

Having thus fully described my invention, what I claim as new, and desire to secure by Letters Patent, is—

A device for preventing animals from jumping, comprising, in combination with a belt, rigid bars having eyes at their upper ends engaging said belt, said bars being substantially the length of the legs of the animal, and provided with eyes at their lower ends, which are forwardly bent, ankle-straps, engaging said eyes at the lower ends of the bars and adapted to be fastened adjacent to the hoof of the animal, as shown and described.

In testimony whereof I hereunto affix my signature in presence of two witnesses.

JOHN JAMES KOGER.

Witnesses:
J. W. MOORE,
GEO. P. CROCKETT.